No. 835,000. PATENTED NOV. 6, 1906.
W. D. SNOW, E. CARL, H. COULSTON & F. PHELPS.
APPARATUS FOR THE MANUFACTURE OF INLAID FLOOR COVERING.
APPLICATION FILED MAY 28, 1904.
7 SHEETS—SHEET 1.

WITNESSES:
John F. Gerby Jr.
Utley E. Crane Jr.

INVENTORS
Wm. D. Snow
Emerson Carl
Harry Coulston and
Frank Phelps
By Chas. N. Butler
ATTORNEY.

No. 835,000. PATENTED NOV. 6, 1906.
W. D. SNOW, E. CARL, H. COULSTON & F. PHELPS.
APPARATUS FOR THE MANUFACTURE OF INLAID FLOOR COVERING.
APPLICATION FILED MAY 28, 1904.

7 SHEETS—SHEET 3.

WITNESSES:
John F. Gerbey Jr.
Utley E. Crane Jr.

INVENTORS
Wm. D. Snow
Emerson Carl
Harry Coulston and
Frank Phelps

By Chas. N. Butler
ATTORNEY.

No. 835,000. PATENTED NOV. 6, 1906.
W. D. SNOW, E. CARL, H. COULSTON & F. PHELPS.
APPARATUS FOR THE MANUFACTURE OF INLAID FLOOR COVERING.
APPLICATION FILED MAY 28, 1904.

7 SHEETS—SHEET 4.

WITNESSES:

INVENTORS
Wm. D. Snow
Emerson Carl
Harry Coulston and
Frank Phelps
By Chas. N. Butler
ATTORNEY.

THE NORRIS PETERS CO., WASHINGTON, D. C.

No. 835,000. PATENTED NOV. 6, 1906.
W. D. SNOW, E. CARL, H. COULSTON & F. PHELPS.
APPARATUS FOR THE MANUFACTURE OF INLAID FLOOR COVERING.
APPLICATION FILED MAY 28, 1904.

7 SHEETS—SHEET 5.

WITNESSES:
INVENTORS
ATTORNEY.

No. 835,000. PATENTED NOV. 6, 1906.
W. D. SNOW, E. CARL, H. COULSTON & F. PHELPS.
APPARATUS FOR THE MANUFACTURE OF INLAID FLOOR COVERING.
APPLICATION FILED MAY 28, 1904.

7 SHEETS—SHEET 6.

No. 835,000. PATENTED NOV. 6, 1906.
W. D. SNOW, E. CARL, H. COULSTON & F. PHELPS.
APPARATUS FOR THE MANUFACTURE OF INLAID FLOOR COVERING.
APPLICATION FILED MAY 28, 1904.

7 SHEETS—SHEET 7.

WITNESSES
INVENTORS
ATTORNEY.

ID

UNITED STATES PATENT OFFICE.

WILLIAM D. SNOW, EMERSON CARL, HARRY COULSTON, AND FRANK PHELPS, OF PHILADELPHIA, PENNSYLVANIA, ASSIGNORS TO THOMAS POTTER SONS AND COMPANY, INCORPORATED, OF PHILADELPHIA, PENNSYLVANIA.

APPARATUS FOR THE MANUFACTURE OF INLAID-FLOOR COVERING.

No. 835,000.  Specification of Letters Patent.  Patented Nov. 6, 1906.

Application filed May 28, 1904. Serial No. 210,192.

*To all whom it may concern:*

Be it known that we, WILLIAM D. SNOW, EMERSON CARL, HARRY COULSTON, and FRANK PHELPS, residents of Philadelphia, in the county of Philadelphia and State of Pennsylvania, have invented certain new and useful Apparatus for the Manufacture of Inlaid-Floor Covering, of which the following is a specification.

This invention relates to the manufacture of floor-covering having variously-shaped tesseræ fitted together to form a design. A primary object of the improvements is to produce simplified automatic mechanism by which various shapes can be punched from differently-colored sheets of linoleum composition or like material and fixed directly to a backing so as to produce a complete design without the tedious and expensive operations of manually arranging them, to provide for readily changing the number of figures, as well as the character of the figures entering into the design, and to secure the ready control of the several operations.

Figure 1:
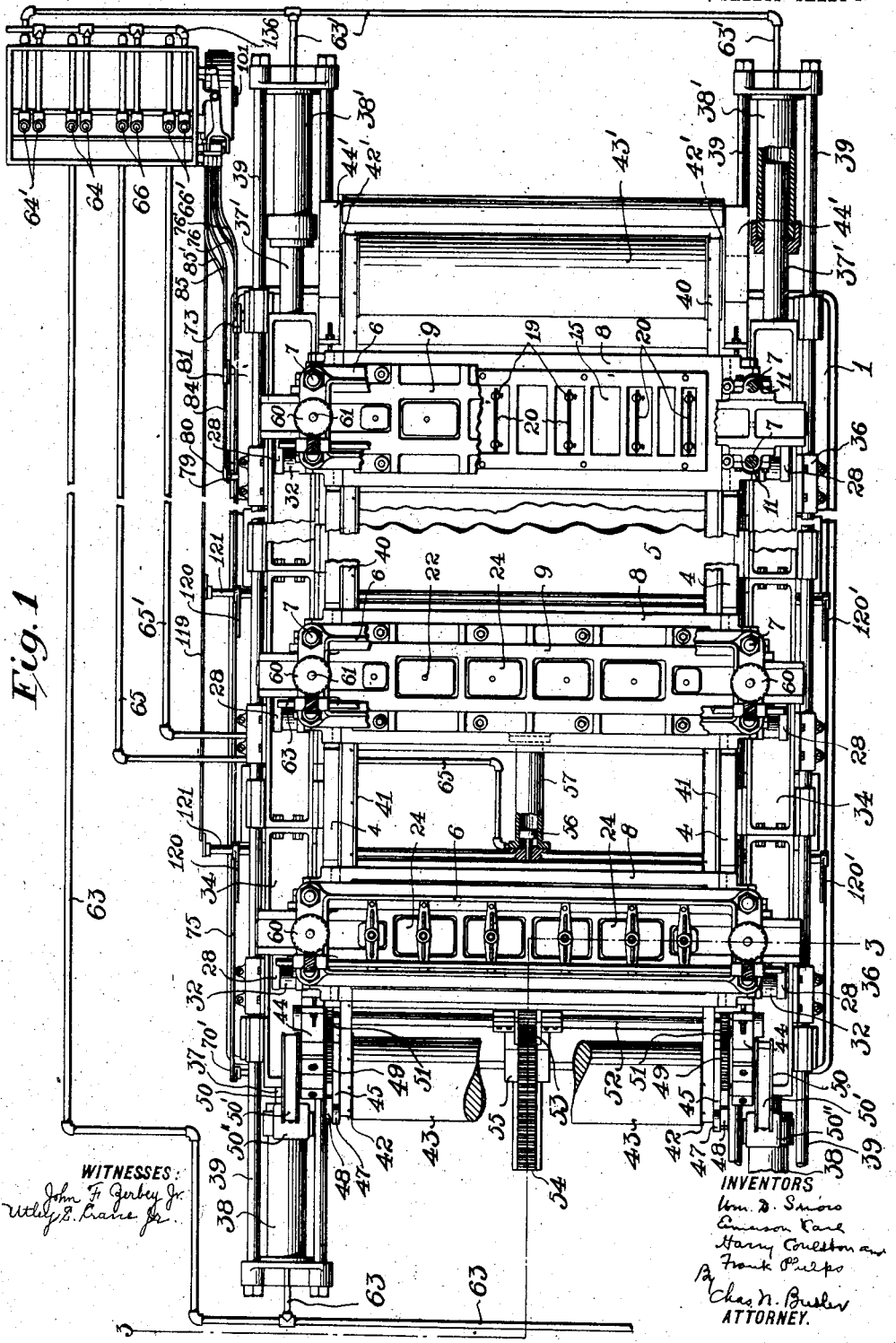
Figure 2:
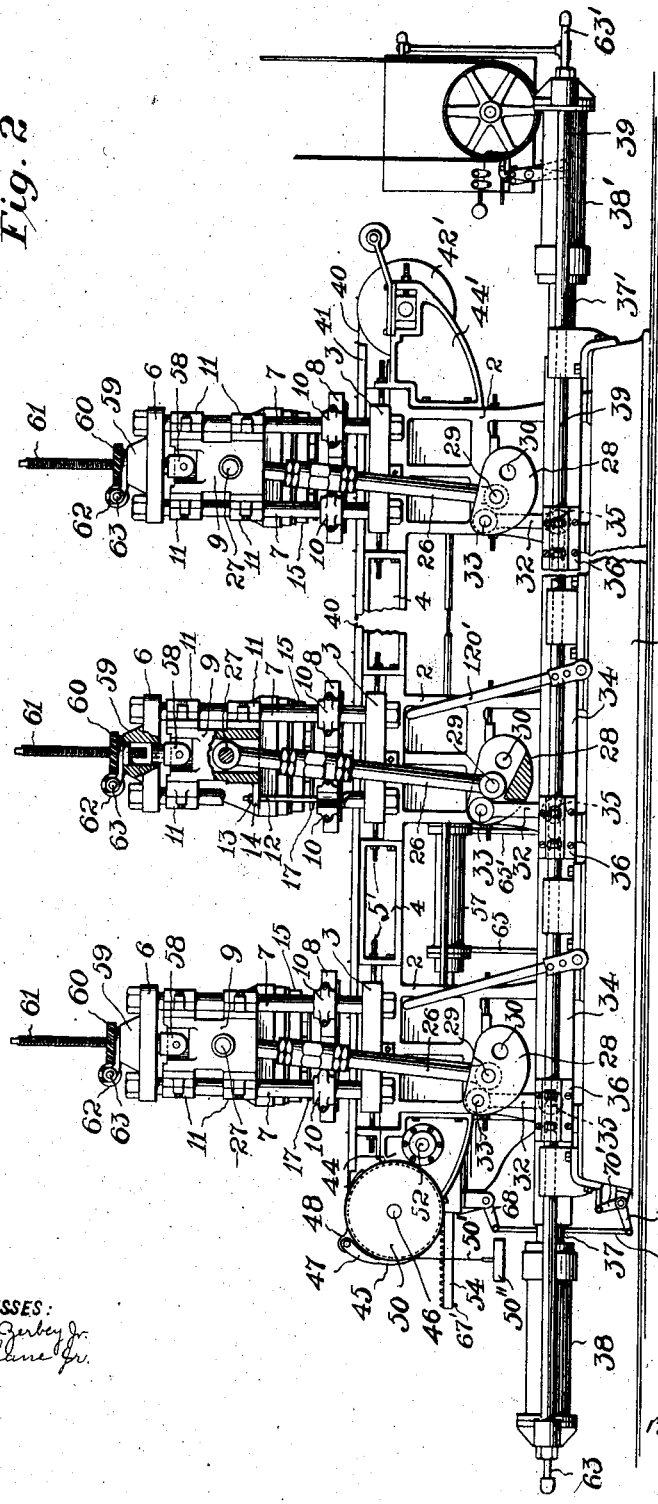
Figure 3:
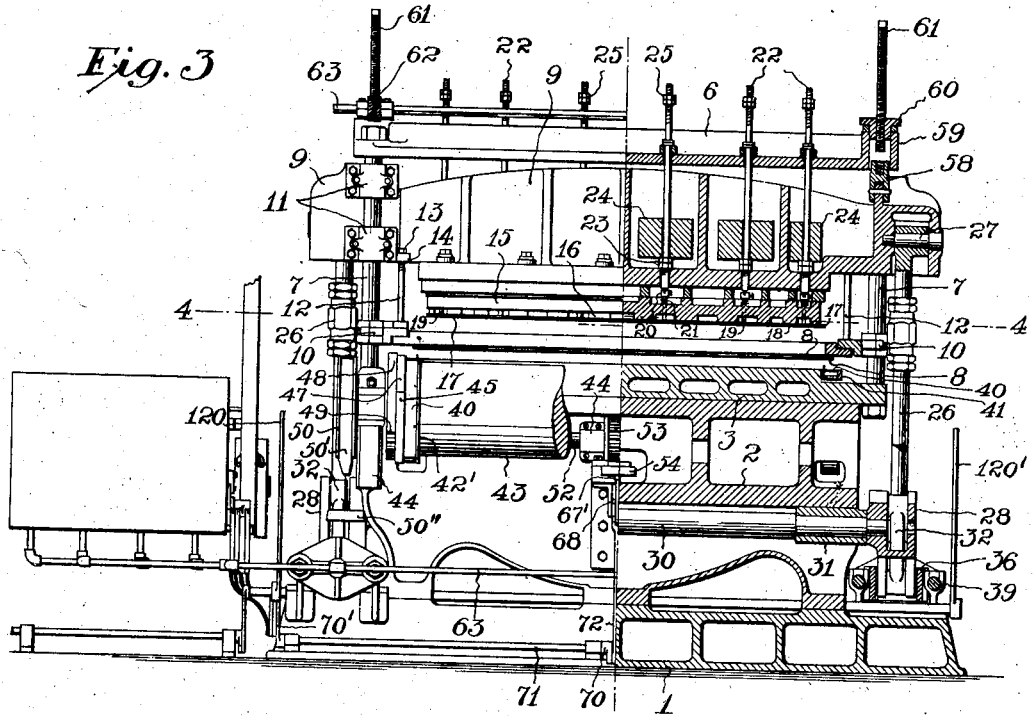
Figure 4:
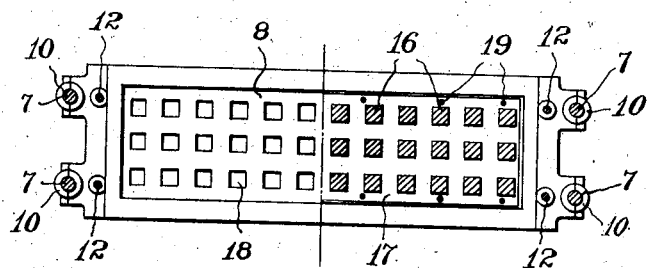
Figure 5:
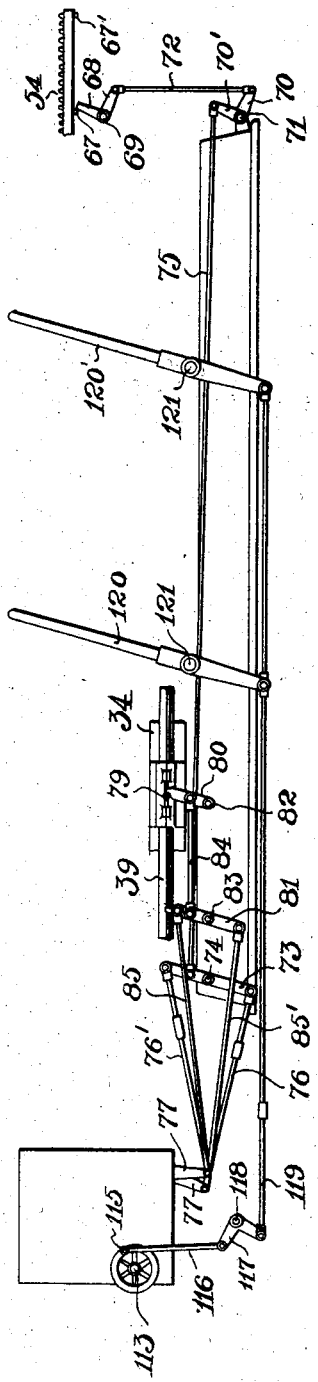
Figure 6:
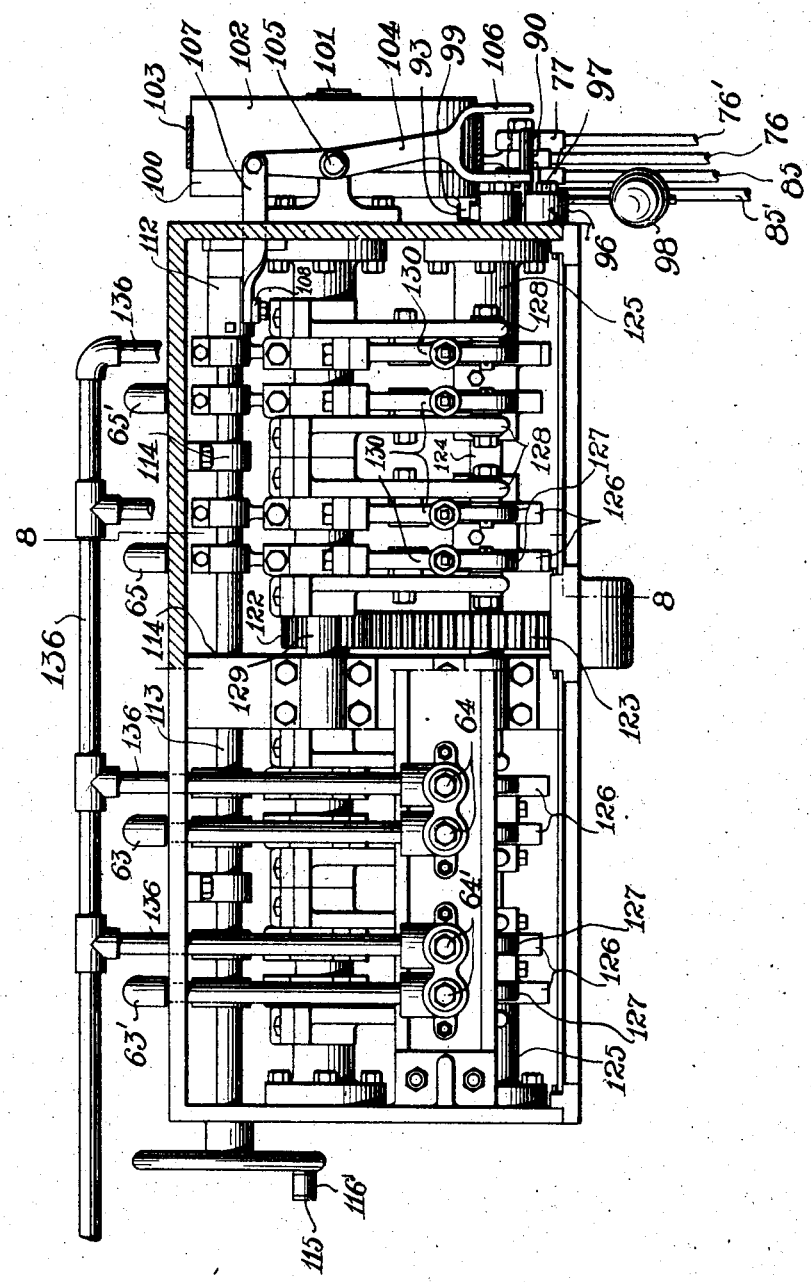
Figure 8:
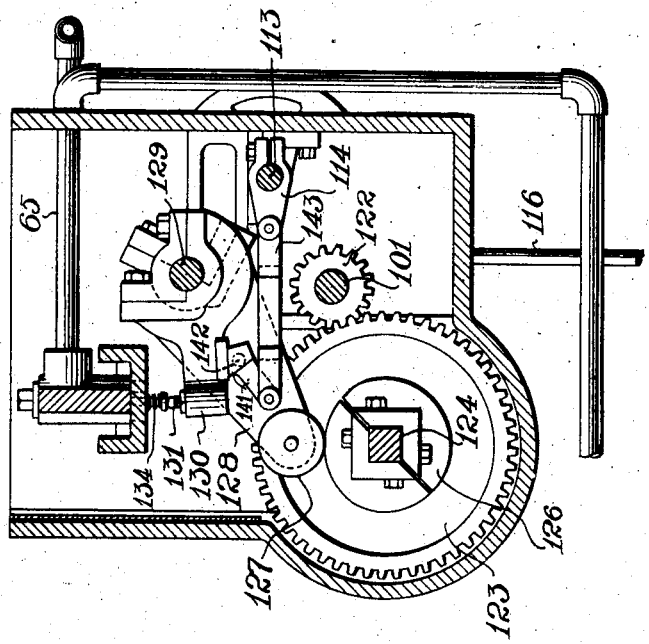
Figure 7:
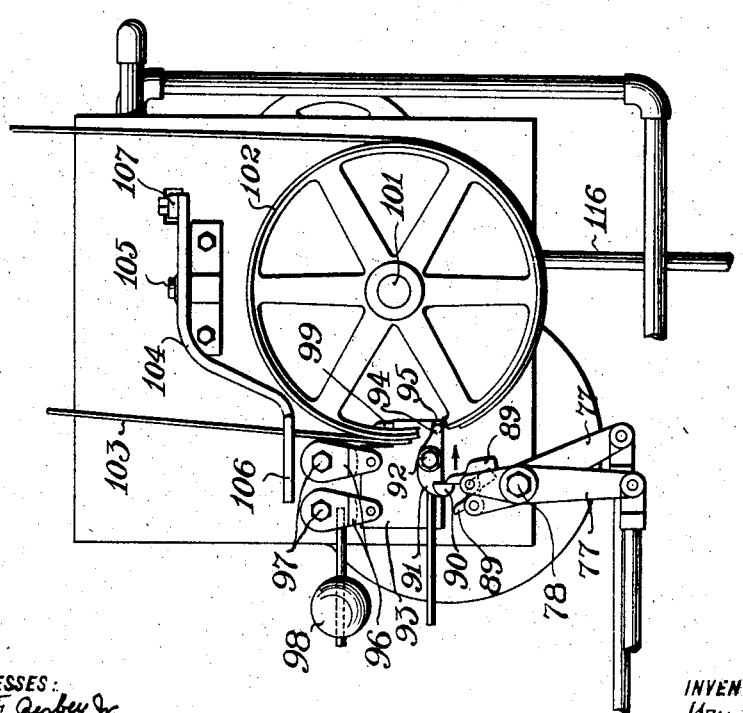
Figure 9:
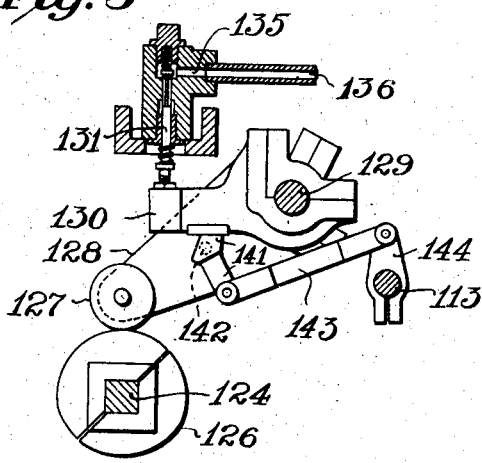
Figure 10:
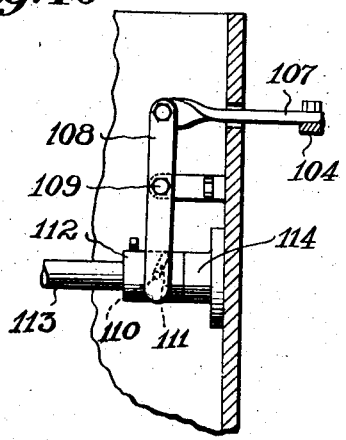
Figure 11:
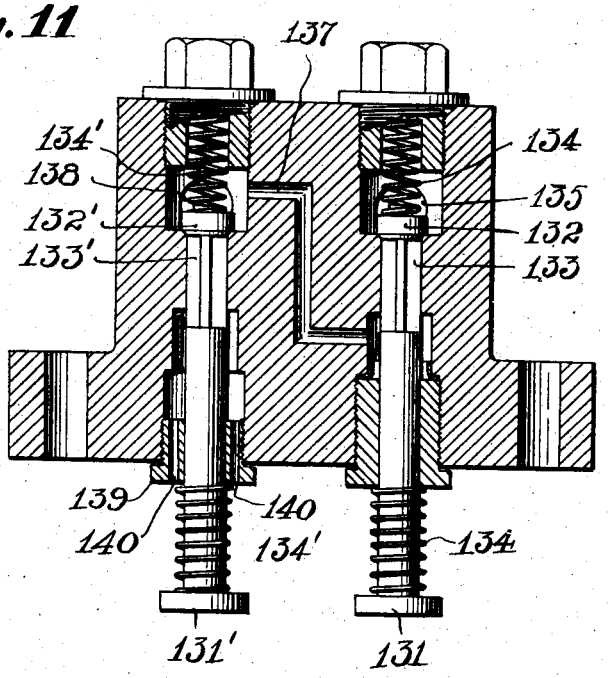

In the accompanying drawings, Figure 1 represents a top plan and partial sectional view of our invention. Fig. 2 represents a side elevation and partial sectional view of the same. Fig. 3 represents an end elevation and partial sectional view taken on the line 3 3 of Fig. 1. Fig. 4 represents a sectional view taken on the line 4 4 of Fig. 3. Fig. 5 represents a side elevation of the valve-operating mechanism. Fig. 6 represents a top plan and sectional view of the valve mechanism. Fig. 7 represents a side elevation of the valve mechanism. Fig. 8 represents a sectional view taken on the line 8 8 of Fig. 6. Fig. 9 is a sectional view representing a second position of part of the mechanism shown in Fig. 8. Fig. 10 is a view of part of the belt-shifting mechanism, and Fig. 11 is a vertical sectional view showing the valve construction.

As shown in the drawings, the base 1 carries the supports 2, having the bed 3 movable thereon, the respective supports and beds being connected together by the braces 4, which carry the table-sections 5 and support the bolts 5' for adjusting the beds. A housing-head 6 is fixed to each of the beds 3 by the housing-rods 7, which guide the reciprocating female die-plates 8 and the reciprocating cross-heads 9, the rods being engaged with the die-plates by the collars 10 and with the cross-heads by the collars 11. The respective die-plates and cross-heads are connected together by the rods 12, having their lower ends fixed in the die-plates and their upper ends provided with the nuts 13 for engaging the cross-head lugs 14, through which they move. Male die or punch plates 15 are fixed to the respective cross-heads, each having thereon dies or punches 16, corresponding to a figure of the design. Stripper-plates 17, having apertures (similar to the apertures 18 of the die-plates) fitting the punches, are connected to the bolts 19, which pass through the punch-plates and are fixed to the cross-bolts 20, the coiled springs 21 on the bolts lying between the bars and punch-plates and acting to counterbalance the stripper-plates. The cross-bars intersect the lines of the rods 22, having thereon the adjustable nuts 23, which engage the cross-heads 9 and weights 24, the upper ends of these rods being provided with the adjustable nuts 25, adapted for engaging the housing-heads 6.

When a cross-head 9 descends, its die-plate 8 is dropped upon the backing, resting on the corresponding bed 3, the nuts 25 engage the housing-head 6 to stop the descent of the rods 22 with the weights 24 and free the stripper-plate 17, and the punches 16 pass through the stripper-plate, forcing tesseræ from properly-placed sheets of linoleum composition through the die-plate onto the backing. This construction permits the stripper-plate to adjust itself to the surface of and hold the sheet of linoleum composition during the operation of punching it and withdrawing the punches, as well as to clean the latter, and upon rising to provide room for manipulating the linoleum.

When the cross-head 9 is elevated, the rods 22 pass therethrough until it engages the nuts 23, through which the weights 24 hold down the rods against the cross-bars 20, pushing the stripper-plate 17 down to its lower limit with reference to the punches 16, which are thereby cleared of any adhering material from the sheet that has been punched. As the cross-head approaches its upper limit it engages the nuts 13 and picks up the die-plate 8, clearing the tesseræ fixed on the backing.

The cross-heads are reciprocated by the connecting-rods 26, pivotally connected therewith by the pins 27 and with the cranks 28 by the pins 29, the cranks being fixed to the shafts 30, journaled in the bearings 31.

The cranks are rocked by the links 32, pivotally connected therewith by the pins 33 and with the reciprocating shafts 34 by the pins 35, the shafts having the shoes 36 thereon working on the rods 39 and the pistons 37 37' at the ends thereof working in the cylinders 38 38', which are tied together by the rods.

The cloth which receives the tesseræ is carried by the toothed bands 40, running in the guides 41 and passing over the wheels 42 42', fixed to the rollers 43 43', the latter being journaled in the respective brackets 44 44'. This carrier mechanism is given an intermittent movement forward by having the ratchet-wheels 45 fixed with relation to the band-wheels 42 through the journals 46 and the ratchet-teeth engaged and the wheels revolved by the reciprocating pawls 47, carried by the arms 48 of the gear-segments 49, which are loose on the journals 46. Brake-wheels 50, fixed to the journals 46, carry the brake-bands 50' and weights 50'' for holding the carrier mechanism in the position to which it is moved.

The gear-segments are oscillated by the pinions 51, fixed on a shaft 52, journaled in the brackets 44, the shaft being oscillated by a pinion 53, fixed thereon and engaged by a rack 54, reciprocated in bearings 55 by a piston 56 acting in a cylinder 57.

Any of the cross-heads 9, with its connections, can be put out of action when desired (as if the complete design can be produced with less than the total number of figures which the machine is capable of placing) by holding such cross-head in its elevated position and disconnecting the corresponding links 32. The respective cross-heads are provided with the threaded sockets 58, and the housing-heads are provided with the threaded sockets 59, the latter acting as bearings for the spiral gears 60, having the bolts 61 running therethrough to engage the sockets 58 and hold the cross-heads elevated. The gears of each head are connected and operated together by the spiral pinions 62, fixed on the shaft 63, which is journaled on the housing-head.

The cylinders 38 and 38' have hydraulic pressure communicated to their outer ends through the respective pipes 63 and 63', controlled by the valves 64 and 64', and the cylinder 57 has hydraulic pressure communicated to its opposite ends by the pipes 65 and 65', controlled by the valves 66 and 66'.

The rack 54 has the lugs 67 and 67' thereon adapted for striking the bell-crank 68, having the fulcrum 69. A lever 70 is fixed to a fulcrumed rod 71 and connected with the bell-crank 68 by the rod 72. The rod 71 has fixed thereto a lever 70', which is connected with the lever 73, having the fulcrum 74, by the rod 75. The opposite ends of the lever 73 are connected by the rods 76 and 76' with levers 77, having the fulcrum 78.

A reciprocating shaft 34 has the lug 79 thereon adapted for striking the ends of the levers 80 and 81, having the respective fulcrums 82 and 83 and connected by the rod 84, the lever 81 being connected by rods 85 and 85' with levers 77. The levers 77 have pivoted thereon the pawls 89, which in moving in the direction of the arrow pass and in moving in the opposite direction positively engage the boss 90 on a counterweighted latch 91, having the fulcrum 92 on the stop 93 and the pin 94, engaging the notch 95 thereof. The stop is pivoted to the links 96, movable on the fulcrums 97, a counterweight 98 acting to restore them and the stop to their normal position. The stop 93 engages a boss 99 on the pulley 100, which is fixed to the shaft 101, having thereon the loose pulley 102, constantly driven by a belt 103. When one of the levers 77 is operated, so that its pawl 89 moves oppositely to the direction of the arrow, it acts through the boss 90 and latch 91 to withdraw the stop 93 from engagement with the boss 99, upon which the pulley 100 revolves. As the boss 99 descends with the revolving pulley, while its part for engaging the stop has been cleared by the withdrawal of the latter, a shoulder on the boss, Fig. 6, which clears the stop strikes the end of the latch, rocking it and elevating the boss 90 to disengage it from the engaging pawl 89. The stop now swings back to its normal position, reëngaging the boss 99 to stop the pulley 100 upon the completion of a revolution, and the latch 91 is carried back to its original position by a counterweight or its rod, adapted for being weighted, the pin 94 thereon engaging the notch 95 to hold the latch in position. The belt is shifted to engage the pulley 100 and drive the shaft 101 by a lever 104, having a fulcrum 105 and a belt-engaging fork 106, the lever being operated through a link 107, connected therewith and with a lever 108, having a fulcrum 109. The lever 108 is operated by having thereon a stud 110, which works in a cam or angle slot 111 of a sleeve 112, the sleeve being fixed on the shaft 113, which is journaled in the bearings 114. The shaft 113 has fixed thereto a crank 115, which is connected by a link 116 with a bell-crank 117, having a fulcrum 118, the bell-crank being connected by the rod 119 with the hand-levers 120 and 120', fixed to the fulcrumed shafts 121.

The shaft 101 has fixed thereto the pinion 122, engaging and driving the spur-wheel 123 and its shaft 124, which is journaled in the bearings 125, the wheel 123 having four times the circumference of the pinion 122. Fixed to the shaft 124 are the cams 126, on which ride rollers 127, carried by the arms 128, journaled on the shaft 129. Arms 130, journaled on the shaft 129, are adapted for striking the stems 131 and 131' of the valve-puppets 132 and 132', which are normally held on the ports 133 and 133' by the springs 134 and 134'. A port 135 communicates with the supply-pipe 136 and through the passage 137 with the port 138, connected in the respective valves 64 64' and 66 66' with the pipes 63 63' and 65 65'.

When a puppet 132 is opened, the corresponding puppet 132' is closed, permitting the corresponding cylinder to be charged, and when the puppet 132 is closed the puppet 132' is opened, permitting the cylinder to exhaust, the gland 139, through which the valve-stem 131 works, having the holes 140 therethrough to permit the escape of the fluid exhausted through the open port 133'. Cams 141, having the pivotal connections 142 with the arms 128, engage and rock the arms 130, the cams being operated by the links 143, pivotally connected thereto and to the arms 144, fixed to the shaft 113.

The several cams 126 are arranged upon the shaft 124 to lift the respective arms 128 and through the cams 141 130, so as to operate the puppets of the respective valves 64 and 64' in the order required for charging the cylinders 38 and 38' alternately, the cylinders 38 being exhausted as the cylinders 38' are charged, and vice versa, and so as to operate the puppets of the respective valves 66 and 66' in the order required for charging and exhausting the opposite ends of the cylinder 57 in alternation.

When the machine is at rest with the die mechanism held in the elevated position and the feeding mechanism held at the forward limit of its stroke, the operation is started by moving a lever 120 or 120' toward the rear of the machine. This rocks the shaft 113, shifting the belt 103 into engagement with the pulley 100 and causing the cams 141 to elevate the arms 130 with relation to the arms 128. Owing to the position of the cams 126 corresponding to the valve mechanism 64, the elevation of the arms 130 by the cams 141 opens the corresponding valve-puppet 132, while the companion puppet 132' remains closed and the cylinders 38 are charged. The shafts 34 are moved thereby and cause the die mechanisms to descend, each die mechanism punching from a sheet of composition placed on the die-plate and setting on the backing tesseræ forming a figure of the design. At the limit of the downward stroke of the die mechanisms the boss 79 on the shaft 34 strikes the lever 81 and moves in opposite directions the levers 77, connected therewith. This effects the withdrawal of the stop 93 from the boss 99, and the pulley 100 is revolved through a revolution, upon the completion of which it is held by the engagement of its boss with the stop which has been restored to its normal position by gravity and the disengagement of the latch from the lever due to the boss striking the pin. A quarter-revolution of the shaft 124 having been effected thereby, the corresponding cams 126 are brought to the position at which the puppet 132' is opened and the puppet 132 is closed in the valve mechanism 64 to permit the cylinders 38 to exhaust, while the puppet 132 is opened and the puppet 132' is closed in the valve-mechanism 64' to permit the cylinders 38' to be charged. This causes the shafts 34 to move from the cylinders 38' and elevates the die mechanisms. At the limit of the movement which elevates the die mechanisms the boss 79 of the shaft 34 strikes the lever 80, rocks the lever 81, and operates in opposite directions the levers 77 connected therewith. As before, the pulley 100 is carried through a revolution and stopped, the shaft 124 and the cams 126 are carried through a quarter-revolution, the valve mechanism 66 and 66' are operated to charge the cylinder 57 through the pipe 65 and discharge through the pipe 65', and the carrier-feeding mechanism is drawn back until the boss 67' on the rack 54 operates the bell-crank 68 and, through the intermediate mechanism, the lever 73 and the levers 77 connected therewith. This again permits the pulley 100 to be moved through a complete revolution and stopped, moving the shaft 124 and its cams 126 through a quarter-revolution, operating the valve mechanisms 66 and 66' to cause the cylinders 57 to be charged through the pipe 65' and discharged through the pipe 66 and effecting a forward movement of the feeding and cloth carrying mechanism operated thereby. At the limit of the forward stroke the boss 67 on the rack 54 rocks the bell-crank 68 and, through the intermediate mechanism, the lever 73 and levers 77 connected therewith, causing the cylinders 38 to charge and the cylinders 38' to exhaust in again carrying down the die mechanism, the cycle being repeated, as before.

The machine is stopped by moving one of the levers 120 or 120' toward the forward end of the machine and rocking the shaft 113 to cause the belt 103 to be shifted from the pulley 100 and to turn the cams 141 so that the levers 130 will be lowered relative to the levers 128, all of the valve mechanisms being thereby closed.

Having described our invention, we claim—

1. In a machine of the class described, mechanism for intermittently advancing a fabric, in combination with vertically-reciprocating male and female die mechanism for simultaneously punching from sheeted material tesseræ comprised in the design and by the same operation setting said tesseræ in their final form on said fabric during its periods of rest said mechanism dropping the female die on the fabric in conjunction with setting the tesseræ, substantially as specified.

2. In a machine of the class described, mechanism for intermittently advancing a fabric, female die mechanism which engages said fabric during its periods of rest, and mechanisms coöperating with said die mechanism for producing the several tesseræ forming the design and setting the same on said fabric during its periods of rest, substantially as specified.

3. In a machine of the class described, feeding mechanism which advances a fabric intermittently, in combination with reciprocating female die mechanism which engages said fabric during its periods of rest, reciprocating male die mechanism coöperating with said female die mechanism for forming and setting tesseræ on said fabric during its periods of rest, mechanism actuated by the feeding movements for operating said die mechanisms; and mechanism actuated by the die movements for operating the feeding mechanisms, substantially as specified.

4. In a machine of the class described, vertically-reciprocating female die mechanism, vertically-reciprocating male die mechanism coöperating therewith, and a stripper-plate through which said male die mechanism acts, said stripper-plate reciprocating relatively to said male die mechanism, to engage the material acted upon and clear the male dies thereof, substantially as specified.

5. In a machine of the class described, a housing, a cross-head reciprocating in said housing, male and female die mechanisms respectively reciprocated by said cross-head, a stripper-plate coacting with said die mechanisms, and means whereby said stripper-plate has a limited movement relative to said male die mechanism to engage the material acted upon and clear the male dies thereof, substantially as specified.

6. In a machine of the class described, a housing, a cross-head reciprocating in said housing, punches connected with said cross-head, a die-plate reciprocating in said housing, and mechanism whereby said cross-head lifts said die-plate, substantially as specified.

7. In a machine of the class described, a cross-head, a punch-plate connected to said cross-head, a stripper-plate carried by said punch-plate and movable relatively to the punches thereof, and a reciprocating die-plate connected to said cross-head, substantially as specified.

8. In a machine of the class described, a housing having a head, a cross-head reciprocating in said housing, punches connected with said cross-head, a stripper-plate movable relatively to said punches, rods having a limited movement through said housing-head and cross-head, and means for connecting said rods with said stripper-plate and causing it to strip said punches, substantially as specified.

9. In a machine of the class described, a housing having a head, a cross-head reciprocating in said housing, punches connected with said cross-head, a stripper-plate movable relatively to said punches, means for counterbalancing said stripper-plate, rods movable through said heads, stops on said rods for engaging said heads, means for depressing said rods, and means for connecting said rods with said stripper-plate, substantially as specified.

10. In a machine of the class described, a bed, in combination with a housing comprising a head and guide-rods, a reciprocating cross-head engaging said guide-rods, male die mechanism connected with said cross-head, a reciprocating female die mechanism engaging said guide-rods, and bolts connecting said cross-head and female die mechanism, said cross-head having a movement relative to said female die mechanism, substantially as specified.

11. In a machine of the class described, a plurality of housings, male and female die mechanisms reciprocating relatively to said housings, mechanism whereby the elevation of the male die elevates the female die, and means for engaging and holding each of said die mechanisms out of action during the operation of the remainder of said die mechanisms, substantially as specified.

12. In a machine of the class described, a housing having a head, die mechanism comprising a cross-head reciprocating in said housing, a threaded socket on said cross-head, and a threaded bolt and bearing carried by said housing-head, said bolt being adapted for engaging said socket, substantially as specified.

13. In a machine of the class described, a reciprocating cross-head, male and female die mechanisms connected with and reciprocated by said cross-head, rods connected with and operating said cross-head, and reciprocating shafts connected with and operating said rods, substantially as specified.

14. In a machine of the class described, a reciprocating die mechanism comprising a cross-head, a rod connected with and reciprocating said cross-head, a reciprocating shaft, mechanism operated by said shaft for actuating said rod, and a piston and cylinder mechanism for operating said shaft, substantially as specified.

15. In a machine of the class described, a housing, die mechanism reciprocating in said housing, connecting-rods pivotally connected in relation to said die mechanism, a shaft, a crank on said shaft and pivotally connected to said rods, a reciprocating shaft and a link pivotally connected in relation to said reciprocating shaft and one of said cranks, substantially as specified.

16. In a machine of the class described, mechanism for intermittently moving a fabric, in combination with die mechanism, reciprocating shafts having pistons at the ends thereof, means by which said shafts are connected with and operate said die mechanism, cylinders in which said pistons work, valve mechanism connected with said cylinders, and means for automatically operating said valve mechanism, substantially as specified.

17. In a machine of the class described, mechanism for intermittently moving a fabric, in combination with die mechanism, a reciprocating shaft having a piston attached to the end thereof, means whereby said shaft is connected with and operates said die mechanism, a cylinder in which said piston works, valve mechanism connected with and controlling the operations of said piston in said cylinder, and mechanism connecting said shaft and valve mechanism whereby the reciprocation of said shaft operates said valve mechanism, substantially as specified.

18. In a machine of the class described, mechanism for intermittently moving a fabric, in combination with a reciprocating shaft having a piston thereon, a cylinder containing said piston, a valve mechanism connected with said cylinder, a fulcrumed lever operated by said shaft, and means for connecting said lever with said valve mechanism to operate it, substantially as specified.

19. In a machine of the class described, a reciprocating shaft having pistons thereon, cylinders in which said pistons work, valve mechanisms connected with said cylinders, mechanism comprising levers operated by said shaft for operating said valve mechanisms, a cross-head and mechanism whereby said cross-head is actuated by said shaft, substantially as specified.

20. In a machine of the class described, carrier-bands, mechanism for feeding said bands comprising a reciprocating piston, a cylinder in which said piston works, valve mechanism connected with said cylinder, a lever connected with and operated by said piston, a lever connected with and effecting the operation of said valve mechanism, and mechanism whereby said first lever operates said second lever, substantially as specified.

21. In a machine of the class described, a bed, mechanism for intermittently advancing a fabric over said bed, in combination with a die mechanism comprising a reciprocating female die, a reciprocating male die adapted for registering with said female die, said female die being dropped on said fabric simultaneously with the lowering of said male die, means for lowering said dies and passing said male die through said female die, and means for elevating said dies and withdrawing said male die from said female die, substantially as specified.

22. In a machine of the class described, carrier mechanism, reciprocating feeding mechanism for operating said carrier mechanism, reciprocating die mechanism, means operated by said die mechanism for operating said feeding mechanism, and means operated by said feeding mechanism for operating said die mechanism, substantially as specified.

23. In a machine of the class described, the combination of a bed and means for adjusting said bed, with mechanism for intermittently advancing a fabric thereon, and mechanism for punching sheeted material and setting the resulting tesseræ during the stationary periods of said fabric, substantially as specified.

In testimony whereof we have hereunto set our hands, this 26th day of May, 1904, in the presence of the subscribing witnesses.

WM. D. SNOW.
EMERSON CARL.
HARRY COULSTON.
FRANK PHELPS.

Witnesses:
LYNDELL MYERS,
CHARLES N. BUTLER.